(12) United States Patent
Huse et al.

(10) Patent No.: US 10,359,178 B2
(45) Date of Patent: Jul. 23, 2019

(54) ELONGATED SUPPORT BOARD

(71) Applicant: Marine Aluminium AS, Avaldsnes (NO)

(72) Inventors: Per Kjartan Huse, Kristiansand (NO); Arild Frøkedal, Valevåg (NO); Kjetil Rovik, Kopervik (NO)

(73) Assignee: Marine Aluminium AS, Avaldsnes (NO)

( * ) Notice: Subject to any disclaimer, the term of this patent is extended or adjusted under 35 U.S.C. 154(b) by 2 days.

(21) Appl. No.: 15/737,089

(22) PCT Filed: Jun. 15, 2016

(86) PCT No.: PCT/NO2016/050127
§ 371 (c)(1),
(2) Date: Dec. 15, 2017

(87) PCT Pub. No.: WO2016/204624
PCT Pub. Date: Dec. 22, 2016

(65) Prior Publication Data
US 2018/0172244 A1    Jun. 21, 2018

(30) Foreign Application Priority Data

Jun. 16, 2015 (NO) .................................. 20150786

(51) Int. Cl.
*E04H 17/00* (2006.01)
*F21V 21/00* (2006.01)
(Continued)

(52) U.S. Cl.
CPC ........ *F21V 15/013* (2013.01); *E04F 11/1808* (2013.01); *E04F 11/1836* (2013.01);
(Continued)

(58) Field of Classification Search
CPC ........ F21V 15/013; F21V 33/006; F21S 4/28; E04F 11/1808; E04F 11/1836;
(Continued)

(56) References Cited

U.S. PATENT DOCUMENTS 3,057,991 A   10/1962   Grenadier
3,131,871 A   5/1964    Foulds
(Continued)

FOREIGN PATENT DOCUMENTS

CA    2538022 A1 *   3/2005   .............. E04F 13/00
KR    100975145       8/2010
NO    159120         12/1986

OTHER PUBLICATIONS

Norwegian Search Report, Norwegian Patent Application No. 20150786, dated Dec. 18, 2015.
(Continued)

*Primary Examiner* — Anabel Ton
(74) *Attorney, Agent, or Firm* — Andrus Intellectual Property Law, LLP

(57) ABSTRACT

An elongated support board is for a walkway. The elongated support board includes a handrail and a knee rail or the like. The elongated support board is provided with a lighting-fixture rail for the attachment of a lighting fixture.

9 Claims, 3 Drawing Sheets

(51) Int. Cl.
*F21V 15/01* (2006.01)
*F21V 33/00* (2006.01)
*F21S 4/28* (2016.01)
*E04F 11/18* (2006.01)
*F21W 111/08* (2006.01)
*H02G 3/04* (2006.01)

(52) U.S. Cl.
CPC ............. *F21S 4/28* (2016.01); *F21V 33/006* (2013.01); *E04F 2011/1872* (2013.01); *F21W 2111/08* (2013.01); *H02G 3/0456* (2013.01)

(58) Field of Classification Search
CPC ........... E04F 11/1872; E04F 2011/0203; E04F 2011/1868; E04F 2011/1897; E04F 11/1804
See application file for complete search history.

(56) References Cited

U.S. PATENT DOCUMENTS

| | | | |
|---|---|---|---|
| 4,161,769 A | 7/1979 | Elliott | |
| 4,293,122 A * | 10/1981 | Coleman | E04F 11/1836 256/21 |
| 4,353,529 A * | 10/1982 | Brown | E04F 11/1804 248/345.1 |
| 4,507,844 A * | 4/1985 | Renaud | B21D 39/063 182/228.1 |
| 4,858,087 A | 8/1989 | Hartshorn | |
| 6,425,676 B1 | 7/2002 | Lyons | |
| 6,533,251 B1 * | 3/2003 | Abbaticchio | E04F 11/1804 256/59 |
| 6,796,630 B2 * | 9/2004 | Ison | B41J 2/14209 347/18 |
| 8,215,786 B2 * | 7/2012 | Sloan | F21V 21/005 362/145 |
| 8,393,457 B2 | 3/2013 | Illedits et al. | |
| 2004/0227135 A1 * | 11/2004 | Shreiner | E04F 11/1804 256/65.16 |
| 2008/0013303 A1 * | 1/2008 | Guarino | E06B 7/28 362/145 |
| 2013/0039052 A1 * | 2/2013 | Forteza | F21V 19/00 362/223 |
| 2014/0347868 A1 * | 11/2014 | Jezsoviczki | F21V 23/026 362/373 |
| 2014/0376231 A1 * | 12/2014 | Cox, Jr. | F21V 29/70 362/294 |
| 2015/0260389 A1 * | 9/2015 | Caron | F21V 29/74 362/218 |

OTHER PUBLICATIONS

International Search Report, PCT/NO2016/050127, dated Aug. 26, 2016.
Written Opinion and Reply, PCT/NO2016/050127, dated Aug. 26, 2016.
Written Opinion and Reply, PCT/NO2016/050127, dated Mar. 27, 2017.
Written Opinion and Reply, PCT/NO2016/050127, dated Jun. 6, 2017.
International Preliminary Report on Patentability, PCT/NO2016/050127, dated Sep. 13, 2017.

* cited by examiner

I-I

ELONGATED SUPPORT BOARD

FIELD

This invention deals with an elongated support board. More particularly, it relates to an elongated support board in association with a walkway, the elongated support board consisting of a handrail, a knee rail or the like.

BACKGROUND

The terminology in this document is in line with the terms used in DSB 41.6 (DSB=the Norwegian Directorate for Civil Protection) "Protection against accidents in industrial work space, . . . ". The term "walkway" denotes any place in which persons walk or stay and in which it is relevant to use an elongated support board. This includes gangways, stairways, landings, floors, platforms or decks.

In some situations, it is necessary to arrange lighting at walkways. A non-limiting example is external gangways in industrial facilities in which other lighting does not provide sufficient illumination to safeguard traffic or work on or from the walkway. Another example may be external stairways on buildings.

It is known to arrange individual brackets for lighting fixtures on or at railings to fix necessary lighting. It is also known to arrange cable racks on a railing or wall near the support board.

Individual brackets for lighting fixtures constitute a considerable extra cost in this connection and may also be aesthetically unfortunate.

SUMMARY

The invention has for its object to remedy or reduce at least one of the drawbacks of the prior art or at least provide a useful alternative to the prior art.

The object is achieved through the features, which are specified in the description below and in the claims that follow.

Walkways of the kind in question here are typically provided with a handrail. In the case of a railing, there is usually also at least one knee rail. The handrail and the knee rail have been given the collective name of support board.

By providing the support board with an elongated lighting-fixture rail which is suitable for carrying lighting fixtures and which may also constitute a necessary cable rack, the installation work directed towards lighting may be considerably simplified while, at the same time, the appearance is improved.

The invention is defined by the independent claim. The dependent claims define advantageous embodiments of the invention.

The invention relates more specifically to an elongated support board in association with a walkway, the elongated support board consisting of a handrail, a knee rail or the like, characterized by the elongated support board being provided with a lighting-fixture rail extending in the longitudinal direction for the attachment of a lighting fixture, alternatively by means of a closing accessory in areas without lighting fixtures, wherein the lighting-fixture rail and the closing accessory constitute additions to the support board and fits complementary to be held fixed in the support board by snap connections, and snap connecting elements extends from the lighting-fixture rail and the closing accessory and are arranged for meshing with connecting portions providing ledges inside the support board.

The support board forms a support for persons and does not include mere cable racks often extending along a railing, for example.

At least the elongated support board or the lighting-fixture rail is formed of a profile, maybe an extruded one. Extrusion is an efficient production method for producing relatively complicated profiles, especially in light metal, such as aluminum.

The support board may constitute part of a railing or be attached to a wall, for example. The walkway may be permanent or temporary. By temporary is meant, here, up to a couple of years' time.

The walkway may include a stairway, be sloping in the direction of walking or have other designs suitable for a walkway. The walkway may be on, above or below the ground. It may be a constructed one or consist of the ground.

The elongated support board according to the invention solves a long-felt problem in a reasonable and aesthetically superior way.

BRIEF DESCRIPTION OF THE DRAWINGS

In what follows, examples of preferred embodiments are described, which are visualized in the accompanying drawings, in which.

DETAILED DESCRIPTION OF THE DRAWINGS

Figure 1:
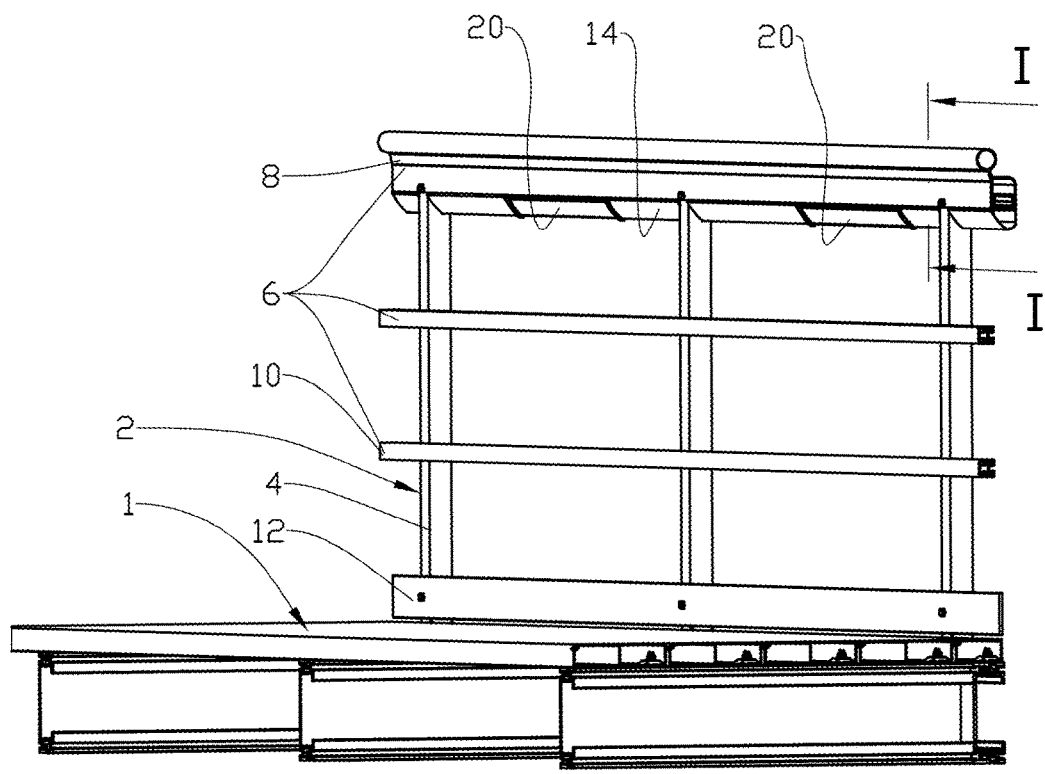
FIG. 1 shows a section of a walkway with a railing, the handrail of the railing being formed in accordance with the invention.

In the drawings, the reference numeral 1 indicates a walkway with a railing 2 which is attached to the walkway 1 here. The railing 2 includes vertical support posts 4 and a number of elongated support boards 6 in the form of a handrail 8 and several knee rails 10. The railing 2 also includes a toe board 12.

Figure 2:
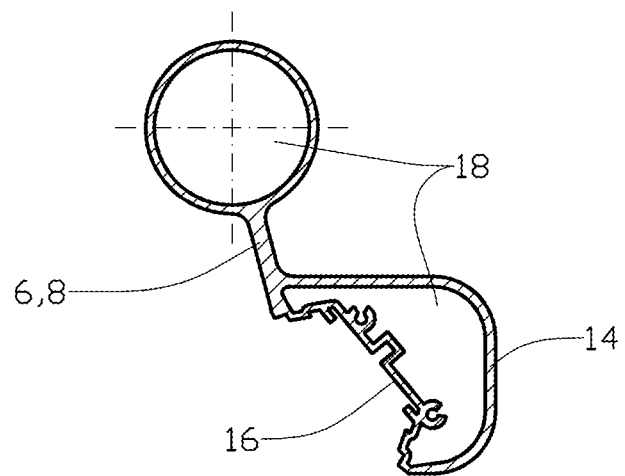
FIG. 2 shows a cross section of a handrail on a larger scale.

FIG. 2 shows an elongated support board 6 in the form of a handrail 8 which is made with a lighting-fixture rail 14 extending in the longitudinal direction. The lighting-fixture rail 14, which, in this exemplary embodiment, is made as part of the support board 6, is provided with lighting-fixture brackets 16. The cavities 18 formed may be used for carrying cables, for example.

Figure 3:
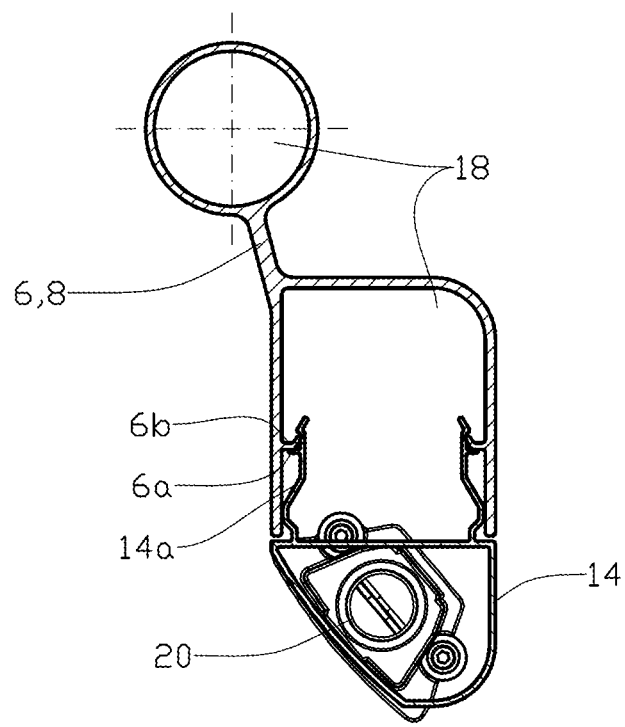
FIG. 3 shows a section I-I of FIG. 1.

FIG. 3 shows a section I-I of FIG. 1. Here, the support board 6 is made as an extruded profile and the lighting-fixture rail 14 as a profile extruded separately and complementarily suitable for "clicking" into the support board 6, that is to say being held fixed by snap connections. Here, the lighting-fixture rail 14 constitutes an addition to the support board 6. Snap connecting elements 14a extends from the lighting-fixture rail 14 and mesh with connecting portions 6a providing ledges 6b inside the support board 6.

A number of lighting fixtures 20 are arranged along the support board 6. The lighting fixture 20 is shown here as recessed into the lighting-fixture rail 14 and may be designed to be "clicked" into the lighting-fixture rail 14 by means of fastening means not shown.

Figure 4:
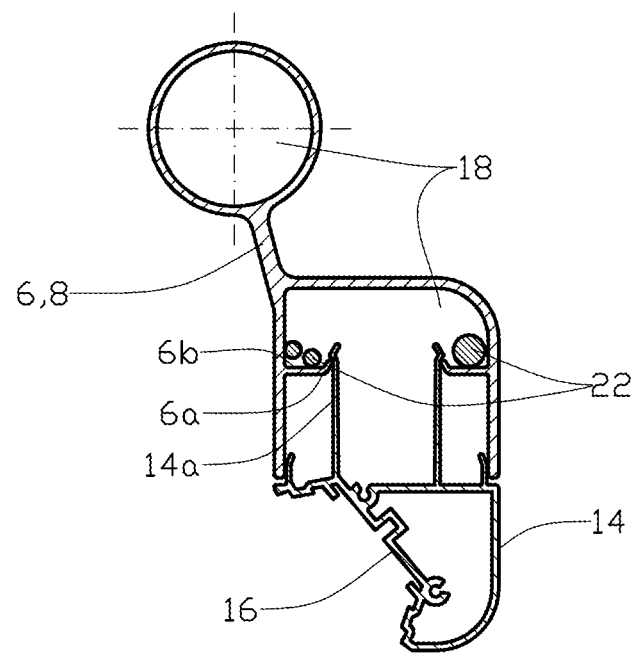
FIG. 4 shows a section of a handrail in an alternative embodiment.

In an alternative embodiment, see FIG. 4, in which the lighting-fixture rail 4 is formed as a separate profile to be attached to the support board 6, cables 22 that are carried in one of the cavities 18 of the support board 6 are shown.

Figure 5:
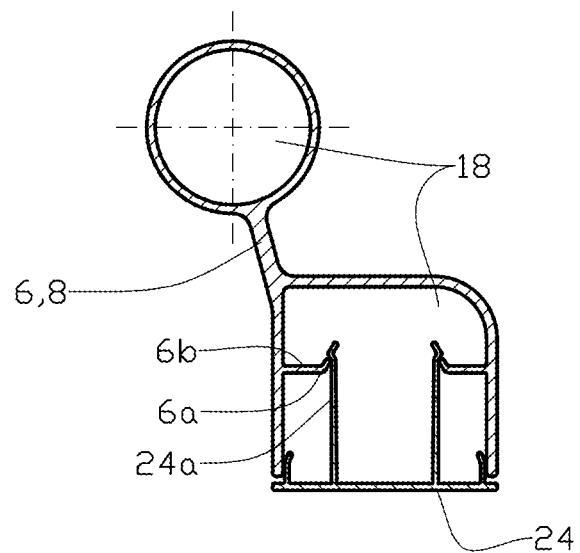
FIG. 5 shows an additional piece of equipment for the handrail of FIG. 4.

FIG. 5 shows the support board 6 in which a closing accessory 24 is arranged, for use in areas where lighting fixtures 20 are not needed. Like with the lighting-fixture rail 14, snap connecting elements 24a extends from the closing accessory 24 and are arranged for meshing with the connecting portions 6a providing the ledges 6b inside the support board 6.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A support railing for a walkway, the support railing comprising:
   support posts that are spaced apart from each other;
   a support board coupled to and extending between the support posts; and
   a plurality of lighting-fixture rails coupled to the support board, each lighting-fixture rail being connected to the support board via snap connecting elements that extend into a respective cavity of a plurality of cavities in the support board, each lighting-fixture rail being configured to support a lighting fixture for lighting the walkway;
   wherein the snap connecting elements are elongated elements that are snap-fit engaged between opposing ledges in the respective cavity, such that each lighting-fixture rail can be manually coupled to the support board and manually uncoupled from the support board.

2. The support railing according to claim 1, further comprising a closing accessory coupled to the support board via snap connecting elements that extend into another respective cavity, wherein the snap connecting elements are elongated elements that are snap-fit engaged between opposing ledges in the respective cavity such that the closing accessory can be manually coupled to the support board and uncoupled from the support board.

3. The support railing according to claim 2, wherein the closing accessory is flush with outer surfaces of the support board when the snap connecting elements are engaged between the opposing ledges in the respective cavity.

4. The support railing according to claim 1, wherein the support board is an extruded profile.

5. The support railing according to claim 1, wherein the lighting-fixture rail is an extruded profile.

6. The support railing according to claim 1, wherein the support board provides a hand-rail for a person walking along the walkway.

7. The support railing according to claim 1, wherein the support board provides a knee-rail for a person walking along the walkway.

8. The support railing according to claim 1, wherein the lighting fixture rail defines a cavity in which an electrical cord for the lighting fixture is disposed.

9. The support railing according to claim 1, further comprising a toe-board that is supported by the plurality of support posts and extends alongside the walkway.

\* \* \* \* \*